June 4, 1963
R. E. PRENTICE
3,091,973
SHUTTER DRIVE MECHANISM
Original Filed Aug. 27, 1957
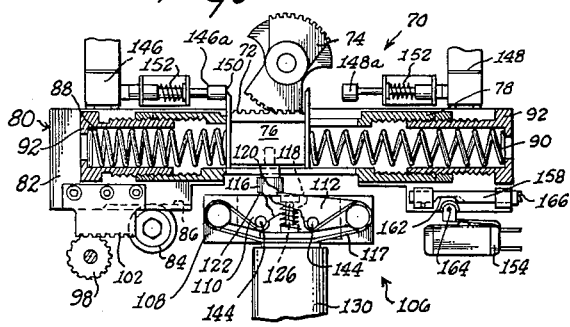
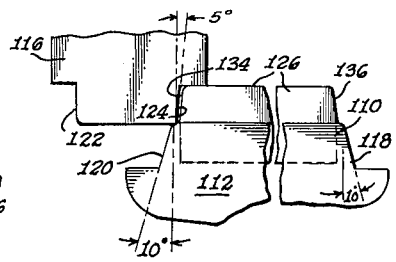
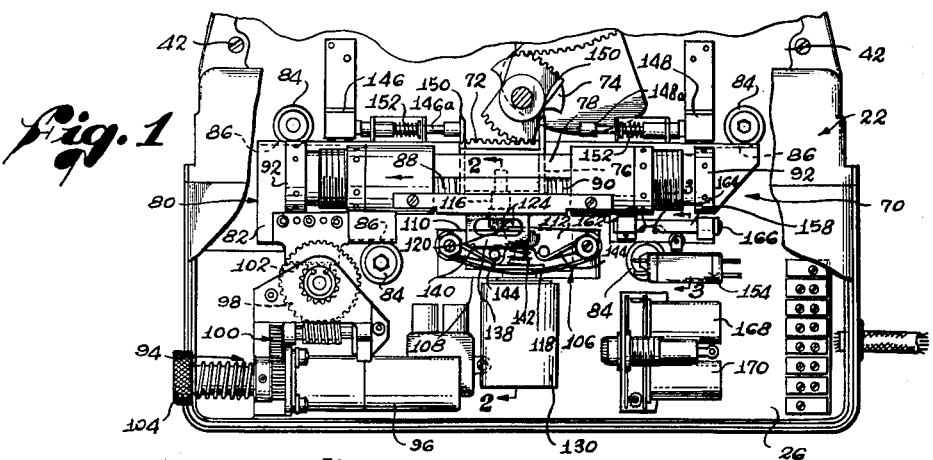
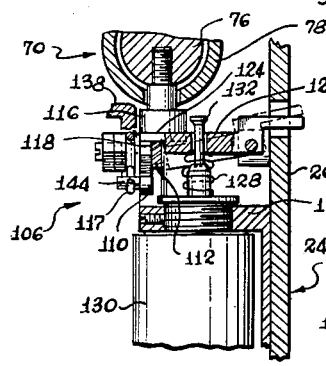
INVENTOR.
RUSSELL E. PRENTICE
BY
Attorney

United States Patent Office 3,091,973
Patented June 4, 1963

3,091,973
SHUTTER DRIVE MECHANISM
Russell E. Prentice, Smithtown, N.Y., assignor to Hycon Mfg. Company, Pasadena, Calif., a corporation of Delaware
Original application Aug. 27, 1957, Ser. No. 680,566, now Patent No. 2,980,004, dated Apr. 18, 1961. Divided and this application Dec. 27, 1960, Ser. No. 80,721
7 Claims. (Cl. 74—2)

This invention relates to shutter mechanisms for cameras, and particularly to a new and improved high speed shutter mechanism for aerial cameras and the like.

This application is a division of my application Serial No. 680,566, filed August 27, 1957, for Camera Shutter Mechanism, now U.S. Patent No. 2,980,004, granted April 18, 1961.

High speed cameras, such as are employed in aerial survey and military photo-reconnaissance work, require shutter mechanisms which are extremely fast in operation, accurately timed, compact, and capable of prolonged service without adjustment or repair.

At the high speeds involved in the operation of shutter mechanisms of the type under discussion, the moving parts of the mechanisms possess substantial kinetic energy at the ends of their stroke. This energy, of course, must be absorbed or dissipated in some manner when the shutter blades are arrested at the end of each exposure.

In order to achieve maximum mechanical efficiency in shutter operation so as to permit a reduction of the power input requirements to the shutter and thereby enable a reduction in the overall size and mass of the shutter, it is desirable that the energy of the moving shutter parts be converted to some useful function in the mechanism. In the existing shutters, this energy is dissipated suddenly by impact of the moving parts with stationary parts. These shutters, therefore, possess low efficiency and require relatively large power inputs. Moreover, the impacts produced cause rapid wear of the parts and make frequent servicing and adjustment of the shutter necessary.

With the foregoing preliminary discussion in mind, a broad object of this invention may be stated as being the provision of a new and improved high speed shutter mechanism for aerial cameras and the like.

Another object is the provision of a high speed shutter mechanism wherein the forces and stresses, arising during operation of the mechanism, are appreciably reduced so as to render the mechanism capable of accurate and prolonged operation without adjustment or repair.

Yet another object is the provision of a high speed shutter mechanism of the character described which possesses higher mechanical efficiency and lower power input requirements than existing shutter mechanisms.

Other objects, advantages and features of the invention will become readily apparent as the description proceeds.

Briefly, the foregoing and other objects are achieved in the illustrative embodiment of the invention by the provision of an integral shutter assembly, including a supporting frame mounting movable shutter blades, blade operating means, and electrical control circuitry for the blade operating means. This shutter assembly is designed for removable insertion between lens elements of a camera in such manner as to permit removal of the shutter mechanism for servicing without disturbing the optical calibration of the camera.

The shutter mechanism itself comprises a set of double ended, rotary shutter blades which are normally positioned with one end of the blades in the aperture opening. Exposures are accomplished by turning the blades, in alternately opposite directions, to retract one end of the blades from the aperture, and position the other ends of the blades in the aperture. Thus, the blades are turned in one direction to effect a given exposure and, in the opposite, to effect the next exposure.

The shutter blades are driven from a pair of compression drive springs through a rack, pinion, and ring gear drive. These drive springs are alternately compressed and released to rotate the shutter blades in alternately opposite directions to effect successive exposures.

Thus, during each exposure, the shutter blades are rotated under the action of one of the drive springs, the remaining spring acting as a brake to arrest the moving parts of the shutter at the termination of the exposure.

These springs are accurately matched to give balanced operation, so that the spring, which is currently acting as the braking spring, absorbs most of the energy released by the driving spring. The braking spring is, therefore, partially compressed at the end of the exposure. In order to condition the mechanism for the next exposure, it is only necessary to complete the compression of the braking spring by replacement of the energy lost by friction and absorbed by blade movement during the previous exposure.

The power input requirements and hence the overall size and mass of the shutter mechanism is, therefore, appreciably reduced. Also, owing to the fact that the shutter blades undergo only unidirectional motion during each exposure, the parts of the mechanism are subject to appreciably reduced shock and strain. The shutter mechanism is, accordingly, capable of prolonged service without adjustment or repair.

The invention may be best understood from the following detailed description taken in connection with the annexed drawings, wherein:

FIGURE 1 is a fragmentary top plan view of the present shutter mechanism in one normal position;

FIGURE 2 is an enlarged section taken along line 2—2 of FIGURE 1;

FIGURE 3 is an enlarged section taken along line 3—3 of FIGURE 1;

FIGURE 4 is an enlarged section through the shutter blade operating assembly of the mechanism; and FIGURE 5 is an enlarged detail of certain latch means embodied in the mechanism.

The following description is directed primarily to the reciprocatory drive mechanism in a camera shutter mechanism. A complete description of the camera shutter mechanism, including the reciprocatory drive mechanism and its relationship and operation therewith, can be found in my above-noted Patent 2,980,004, granted April 18, 1961, and such description is incorporated herein by reference thereto to provide a disclosure of overall operation and details of other particular elements and mechanisms, which are disclosed only in general terms and not definitely claimed below.

Referring now to these drawings, the camera shutter mechanism will be seen to comprise a frame including a pair of normally upper and lower frame sections 22 and 24. Lower frame section 24 comprises a generally rectangular base portion 26 and a tapered, terminally rounded upper portion (not shown). The shutter drive mechanism is mounted in the base portion 26 as illustrated.

The shutter drive mechanism comprises a shutter operating member consisting of a reciprocable rack 72 which is moved in one longitudinal direction during a given exposure, and in the opposite longitudinal direction during the next exposure. A pinion 74, journalled on the upper frame section 22 and meshing with the rack 72, serves to convert this opposite longitudinal movement of the rack to angular movement of a ring gear (not shown) through a given angle and drive associated blades (not shown) of the shutter.

Rack 72 is fixed to a slug 76 which is slideably and non-rotatably received in a sleeve 78. The rack projects exteriorly of the sleeve, for engagement with the pinion 74, through an elongate slot in the wall of the sleeve. Sleeve 78 forms part of a movable carriage, which is generally designated by the numeral 80.

Carriage 80 further includes a generally rectangular base plate 82 to which the sleeve 78 is rigidly secured. Carriage 80 is movably supported on the rectangular base portion 26 of the lower frame section 24 by means of four bearing rollers 84.

Bearing rollers 84, which are similar to the ring gear supporting bearing rollers 64, are journalled on the lower frame section and peripherally engage in grooves 86 in the opposite side edges of the carriage base plate 82. The sleeve 78 is thereby supported on the lower frame section for right and left hand axial movement, as the mechanism is viewed in the drawings.

Positioned within opposite ends of the sleeve 78 are a pair of compression drive springs 88 and 90. These springs abut at opposite ends the adjacent end of the slug 76 and closure plugs 92, which are threaded in the ends of the sleeve 78, as shown.

During operation of the mechanism, the slug 76 is moved in opposite directions by the action of the drive springs 88 and 90. The plugs 92 are adjustable, by threading thereof into and out of the sleeve 78, for the purpose of equalizing the tension of the drive springs to achieve balanced operation, as will be presently more fully discussed.

Generally indicated at 94 is a motor drive assembly for moving the carriage 80, and the sleeve 78 thereon, in opposite axial directions. This motor drive assembly comprises a reversible D.C. motor 96 which rotates a final driven gear 98 through suitable reduction gearing 100. Driven gear 98, in turn, meshes with a rack gear 102, fixed to the carriage plate 82.

Operation of the motor 96, therefore, drives the carriage 80 in one direction or the other, depending on the direction of rotation of the motor. A manual knob 104 is provided for manually turning the driven gear 98 to move the carriage.

Generally indicated at 106 is a latch assembly for releasably retaining the slug 76 against movement with the carriage 80. This latch assembly comprises an upstanding latch support 108 fixed to the base portion of the lower frame section 24 directly below and centrally of the carriage 80, as the mechanism is viewed in FIGURE 1.

Pivotally connected at one end to opposite ends of the latch support 108 are a pair of arresting latch fingers 110 and 112. The tip of the left hand latch finger 110 overlies the tip of the right hand latch finger, as shown. The tips of these latch fingers are biased toward the carriage 80 and against a projecting latch block 116 on the movable slug 76 by a spring wire 117. Latch block 116 projects exteriorly of sleeve 78, for contact with the latch fingers, through an elongate slot in the wall of the sleeve, as shown.

The edges of the latch fingers 110, 112, engageable with the latch block, are notched adjacent the tips of the fingers to form shoulders 118 and 120. These finger shoulders 118 and 120 are engageable with shoulders 122 and 124, formed on the latch block 116, to retain the slug 76 against movement in one direction or the other.

Thus, when the slug is moved to its right hand limiting position, as the mechanism is viewed in FIGURE 4 shoulder 118 on latch finger 110 engages the left hand latch block shoulder 122 to latch the slug against left hand movement.

Similarly, when the slug 76 is moved to its left hand limiting position, the shoulder 120 on the latch finger 112 engages the right hand latch block shoulder 124 to latch the slug 76 against right hand movement.

The latch block shoulders 122 and 124 are inclined at a 5° angle relative to the shoulders 118 and 120 of the latch fingers, as shown in the detail of FIGURE 5, to promote proper engagement and disengagement of these shoulders during operation of the mechanism, as will be described.

Also embodied on the latch assembly 106 is a trip latch comprising a latch plate 126 located between the shoulders 118 and 120 of the latch fingers. This latch plate is pivotally connected along one edge to the base of the latch support 108 on that side of the latter proximate to the carriage 80.

As shown most clearly in FIGURE 2, the free end of the latch plate 126 is located below the plane of the underside of latch finger 112 and just above the plane of the underside (as viewed in FIGURE 2) of the latch block 116. The latch plate 126 is swingable between its solid line latching position of FIGURE 2, wherein the free end of the latch plate is located in the path of the latch block shoulders 122, 124, and its phantom line released position of FIGURE 2. In this released position, the free end of the latch plate clears the latch block.

Normally, the latch plate is retained in its solid line latching position by a coil compression spring 128, shown in FIGURE 2. Retraction of the latch plate to its released position is effected by energizing of a solenoid 130 including a headed plunger 132 which extends loosely through an enlarged opening in the plate. When the solenoid is energized, the plunger 132 is drawn downwardly, as viewed in FIGURE 2. The head on the plunger is thereby engaged with the latch plate to rock the latter to its phantom line, released position.

The opposite side edges 134 and 136 of the latch plate, which edges are engageable with the latch block shoulders 122, 124 as described below, are disposed just slightly behind the adjacent shoulders 118, 120 on the latch fingers 110 and 112, as may be most readily observed in FIGURE 5. It will be clear, therefore, that when either of the shoulders on the latch fingers is engaged with its respective latch block shoulder 122 or 124 to latch the slug 76 against movement in one direction or the other, the latch plate 126 may freely rock to its latching position in the path of the engaged latch block shoulder. The latch block engaging edges 134, 136 of the latch plate are parallel the latch block shoulders 122, 124, as shown.

Fixed to the carriage sleeve 78, centrally thereof, is a cam plate 138. Cam plate 138 is of generally rectangular configuration and has two of its corners bevelled to form cam faces 140 and 142. These cam faces are engageable with upstanding pins 144 on the latch fingers 110 and 112 during movement of the carriage 80 in opposite directions for camming the latch fingers out of latching engagement with the latch block 116, as will be presently described.

Referring to FIGURE 1, a pair of double pole, double throw, left and right hand start switches 146 and 148, respectively, will be seen to be mounted on the lower frame section 24 at opposite ends of the rack gear 72 fixed to the movable slug 76. The rack gear is formed at its ends with projecting shoulders 150 engageable, at opposite ends of the stroke of the slug, with the plungers 146a and 148a of the start switches 146 and 148.

Surrounding the plungers 146a and 148a are springs 152 for biasing the left hand plunger 146a toward the right to a position wherein the right hand contacts 146b of the left start switch 146 are closed, and biasing the right hand plunger 148a toward the left to a position wherein the left hand contacts 148b of the right hand start switch are closed. The parts are so located that the left hand rack shoulder 150 engages the plunger 146a of the left hand start switch 146, to open the normally closed contacts 146b and close the normally open contacts 146c of the latter switch, upon left hand movement of the slug 116 to a position slightly short of its left hand limiting position wherein the right hand latch finger 112 snaps into place in front of the right hand latch block shoulder 124.

Similarly, the right hand rack shoulder engages the plunger 148a of the right hand start switch 148, to open the normally closed contacts 148b and close the normally open contacts 148c of the latter switch, upon right hand movement of the slug 116 to a position just slightly short of its right hand limiting position wherein the left hand latch finger 110 snaps into place in front of the left hand latch block shoulder 122.

Indicated at 154 and 156 are a pair of right and left limit switches. These switches are mounted one over the other on the lower frame section 24 adjacent the lower right hand corner of the carriage plate 82, as the mechanism is viewed in FIGURE 1. The actuating elements 154a and 156a of these switches are engageable with elongate cam elements 158 and 160 mounted one over the other on the carriage plate 82, as shown. The right limit switch 154 is normally open while the left limit switch 156 is normally closed.

The cam elements 158 and 160 are formed with recesses 162 and intermediate inclined cam faces 164, as shown. The limit switches occupy their above-described normal positions when their respective actuating elements 154a and 156a are engaged in the cam recesses 162 and are operated to their other positions during relative travel of the actuating elements over the inclined cam faces 164 to the raised portions of the cams.

The inclined cam face on the lower cam element 160, associated with the left limit switch 156 is offset slightly to the right, as viewed in FIGURE 1, relative to the inclined cam face on the upper cam element for reasons to be described. Means 166 are provided for axially adjusting the cam elements to vary this offset of the inclined cam faces 164, as well as to locate the inclined cam faces in predetermined relation to the carriage 80, as will be presently discussed.

The control circuit of the mechanism further embodies a pair of relays 168 and 170 which are supported in side-by-side fashion on the lower frame section, as shown in FIGURE 1.

*Operation*

The parts of the mechanism will be assumed to be initially in their intermediate position. In this condition of the mechanism, the carriage 80 is located in a centered position intermediate the limits of its travel.

The slug 76, which is now unlatched so as to be freely movable in the carriage sleeve 78, is retained in a center position in the sleeve by the drive springs 88 and 90. The tension in these springs, of course, is now equalized. The threaded plugs 92 in the ends of the carriage sleeve permit adjustment of the initial tension in the drive springs, as well as centering of the slug 76 in the carriage sleeve.

The latch block 116 is now centered with respect to the latch shoulders 118 and 120 of the latch fingers 110 and 112 and the latch plate 126. When the slug 76 is in its center position, the shutter blades occupy their intermediate, wide open position. The actuating elements 154a and 156a engage the raised portions of the cams 158 and 160, so that limit switch 154 is closed and limit switch 156 is open.

When a D.C. voltage is impressed on the input terminals of the shutter mechanism, motor 96 is first polarized to drive the carriage toward the left, as viewed in FIGURE 1. The slug 72, of course, moves to left with the carriage. The shutter blades are thereby turned to one of their normal closed positions.

During travel of the carriage to the left, the right limit switch 154 remains closed due to engagement of its actuating element 154a with the raised cam surface portion of its cam element 158. Upon movement of the carriage 80 to the left to a position (FIGURE 1) wherein the right hand latch block shoulder 124 just clears the shoulder 120 on the right hand latch finger 112, the latter and the trip latch plate 126 snap in behind the latch block to latch the latter against right hand movement. The left start switch 146 is now operated by engagement of its plunger 146a with the slug rack gear 72.

This action cuts the power of the motor 96 and the relay 168, and motor 96 is immediately reenergized for reverse rotation to drive the carriage 80 to the right.

During this movement of the carriage to the right, the left hand drive spring 88 is compressed against the slug 76 which, as just mentioned, is latched in its left hand limiting position wherein the shutter blades are in one normal position closing the shutter aperture. Engagement of the cam plate 138 on the carriage with the right hand latch finger pin 144 during this right hand travel of the carriage retracts the latch finger 112 to its released position. The trip latch plate 126, however, retains the slug 76 in its left hand latching position.

Right hand movement of the carriage is terminated by return of the right limit switch 154 to its normal open condition which cuts the power to the motor 96. This return of the limit switch 154 to its normal condition, of course, occurs when the actuating element 154a of the switch rides into the recess 162 of the upper cam element 158. The upper cam element is so axially adjusted that the right limit switch is thus opened when the carriage 80 has been driven to a position (FIGURE 4) slightly past its center position, as discussed more fully below. The shutter mechanism is now conditioned for an exposure.

An exposure is initiated by energizing the trip latch solenoid 130 to retract the latch plate 126 and thereby release the slug 76 for right hand movement in the carriage sleeve 78 under the action of the now compressed, left hand drive spring 88. The solenoid 130 is energized by applying a pulse to its input terminals.

Upon release, slug 76 is propelled to a right hand limiting position wherein the left hand latch finger 110, which clears the cam plate 138 in the present right hand position of the carriage 80, snaps in behind the left hand latch block shoulder 122. The slug 76 is then latched against left hand movement.

During this right hand travel of the slug 76, the shutter blades are turned in one direction from their normal closed position, through their intermediate position, to their other normal closed position to effect an exposure. Upon latching of the slug in its right hand limiting position, therefore, the shutter aperture is reclosed.

As preliminarily mentioned, during each exposure, one drive spring operates the shutter blades, and the other drive spring acts as a brake to arrest the moving parts of the mechanism. Thus, during the above right hand travel of the slug 76, the right hand drive spring 90 acts as a brake. As earlier noted, the drive springs comprise a matched set. The right hand spring, therefore, absorbs a substantial portion of the energy released by the compressed, left hand driving spring during the first exposure and is thus partially compressed when right hand movement of the slug is finally arrested.

When the mechanism is properly adjusted, the slug is arrested in its right hand travel slightly beyond its right hand latching position wherein the left hand latch block shoulder 122 just clears the shoulder 118 on the left hand latch finger 110. This permtis the latter finger to snap in behind the latch block and latch the slug against left hand movement.

To this end, the cam element 158, associated with the right limit switch 154, is so initially axially adjusted by the means 166 as to effect initial driving of the carriage 80 to the right to a position whereat the left hand drive spring 88 is sufficiently compressed to accomplish propelling of the slug slightly beyond its right hand latching position, in the manner just mentioned.

During the second exposure, the slug 76 is propelled to the left by the right hand drive spring 90, the left hand spring 88, in this instance, acting as a brake to arrest the slug slightly beyond its left hand latching position. Owing to friction and inertial losses, of course, the energy absorbed by the right hand drive spring 90 during the first exposure is less than that released by the left drive spring 88. The partial compression of the right drive spring 90 by the slug at the end of the first exposure is, therefore, insufficient to propel the slug 76 to its left hand latching position, and thereby complete the second exposure.

To condition the mechanism for the second exposure, therefore, additional energy, at least equal to that lost during the first exposure, must be added to the right hand drive spring 90 at the end of the first exposure. This additional energy is supplied by the motor 96 which automatically drives the carriage 80 to the left at the end of the first exposure. The right hand drive spring 90 is thereby additionally compressed against the slug 76, which is then latched in its right hand limiting position.

The right hand drive spring is thus additionally compressed until its compression substantially equals that possessed by the left hand drive spring 88 at the initiation of the first exposure.

This movement of the carriage to the left is accomplished as follows. Relay 168 is energized so that motor 96 is suitably energized, to drive the carriage 80 to the left. The right hand drive spring 90 is thereby compressed against the slug 76 which is latched in its right hand limiting position, as mentioned above.

This left hand travel of the carriage continues until the left limit switch 156 is opened by engagement of its actuating element 156a with the inclined cam face 164 of its associated cam element 160. The power to the relay 168 and the motor 96 is thereby cut off.

The cam element 160 is initially so axially adjusted, by means 166, that this left hand travel of the carriage is terminated, as previously indicated, when the compression of the right hand drive spring 90 is sufficient to propel the slug 76 to its left hand latching position. The carriage 80 is then located slightly to the left of its center position, and this compression of the right hand drive spring approximately equals the compression of the left hand drive spring 88 at the initiation of the first exposure. For this reason the cam face 164 of the cam 160 is located to the right of cam face 164 on cam 158, as shown and previously mentioned.

During this left hand travel of the carriage, the cam plate 138 on the carriage engages the pin 144 on the left hand latch finger 110 and cams the latter to its released position. The latch plate 126 will have been returned to its latching position, in the path of the slug latch block 116, prior to release of the left hand latch finger 110. The slug 76, therefore, remains latched in its right hand limiting position.

The shutter mechanism is now conditioned for the second exposure which is again initiated by energizing the trip latch solenoid 130. When the solenoid is again energized to retract the trip latch plate 126, the slug 76 is released and propelled to the left by the now compressed right hand drive spring 90. During this left hand travel of the slug, the shutter blades are rotated, in a direction opposite to their rotation during the first exposure, to effect the second exposure.

Movement of the slug 76 to the left is arrested by the left hand drive spring 88 when the slug is just slightly beyond its left hand latching position. The right hand latch finger 112 now snaps in behind the latch block 116 to latch the slug in this latter position.

During arresting of the slug 76, the left hand drive spring absorbs a portion of the energy released by the right hand spring and is thereby partially compressed in the same manner as the right hand drive spring during the first exposure. As before, however, the energy losses occurring during the second exposure must be supplied to the left hand drive spring 88 to condition the mechanism for the third exposure. This is accomplished by driving of the carriage 80 to the right to the position it occupied at the initiation of the first exposure.

Thus, when the slug 76 is released to effect the second exposure, the right start switch 148 is returned to its normal condition and immediately thereafter the left start switch 146 is operated by the slug. Also, since the carriage 80 is, at this time, at the left hand limit of its travel, left limit switch 156 is open, as mentioned above, and the right limit switch 154 is closed. Relay 168 is now deenergized.

The motor 96 is now energized, in the manner described with reference to operation of the mechanism, prior to the first exposure.

Motor 96, therefore, drives the carriage 80 to the right and the left hand drive spring 88 is again compressed against the slug 76 which is now latched in its left hand position.

During this right hand movement of the carriage, the currently engaged latch finger 112 is cammed to its released position and the trip latch plate 126 is in its latching position in front of the latch block 116. The slug is thereby retained in its left hand latching position, as before.

Upon opening of the right limit switch 154 to terminate right hand movement of the carriage, in the manner described with reference to conditioning of the mechanism for the first exposure, the mechanism is conditioned for initiation of the third exposure. Operation of the mechanism during this third, as well as every odd numbered exposure thereafter, is identical to its operation during the first exposure. Similarly, operation of the mechanism during the fourth and every even numbered exposure thereafter is identical to its operation during the second exposure.

From the above description, it will be clear that the shutter blades are turned in only one direction during each exposure. Shock and strain on the mechanism is thereby substantially reduced. The mechanism is, therefore subject to reduced wear so as to be capable of prolonged operation without adjustment or repair.

Further, owing to the alternate use of the drive springs as brakes, so as to absorb a portion of the energy released by the driving spring, the mechanical efficiency of the mechanism is greatly enhanced. The power input requirements to the mechanism, as well as its size and mass, are, therefore, substantially reduced.

Numerous modifications in design, arrangement of parts, and instrumentalities of the invention will be apparent within the scope of the following claims.

I claim:
1. A reciprocatory drive mechanism, comprising a frame, a driven member mounted on said frame for movement in opposite directions between given limiting positions, releasable latch means for latching said member in said limiting positions upon movement of the member to the positions, yieldable means acting between said frame and member for biasing the latter to a position between said limiting positions whereby when said member is latched in either of said limiting positions said yieldable means is tensed in a direction to propel said toward the opposite limiting position when said latch means are released and said yieldable means acts to arrest travel of said member toward said opposite limiting position, and means for additionally tensing said yieldable means in said latter direction when said member is latched in each of said limiting positions sufficient to effect propelling of the member when released to the opposite limiting position against the arresting action of said yieldable means.

2. A reciprocatory drive mechanism, comprising a frame, a driven member mounted on said frame for movement in opposite directions between given limiting positions, releasable latch means for latching said member in said limiting positions upon movement of the member to the positions, yieldable means acting between said frame and member for biasing the latter to a position between said limiting positions whereby when said member is latched in either of said limiting positions said yieldable means is tensed in a direction to propel said member toward the opposite limiting position when said latch means are released and said yieldable means acts to arrest travel of said member toward said opposite limiting position, and electrically operated means for additionally tensing said yieldable means in said latter direction when said member is latched in each of said limiting positions sufficient to effect propelling of the member when released to the opposite limiting position against the arresting action of said yieldable means.

3. A reciprocatory drive mechanism, comprising a frame, a driven member mounted on said frame for movement in opposite directions between given limiting positions, releasable latch means for latching said member in said limiting positions upon movement of the member to the positions, yieldable means acting between said frame and member for biasing the latter to a position between said limiting positions whereby when said member is latched in either of said limiting positions said yieldable means is tensed in a direction to propel said member toward the opposite limiting position when said latch means are released and said yieldable means acts to arrest travel of said member toward said opposite limiting position, electrically operated means for additionally tensing said yieldable means in said latter direction when said member is latched in each of said limiting positions sufficient to effect propelling of the member when released to the opposite limiting position, and means operated by said member upon movement of the latter to said limiting positions for rendering said electrically operated means operable to additionally tense said yieldable means.

4. A reciprocable drive mechanism comprising a frame, a carriage, and a driven member mounted on said frame for movement in given opposite directions relative to one another and to said frame, said member being movable in said given directions between limiting positions with respect to said frame, releaseable latch means for latching said member in said limiting positions upon movement of the latter member to said limiting positions, yieldable means acting between said carriage and member for biasing the latter member to a central position relative to the carriage, and means for moving said carriage when said member is latched in each of said limiting positions toward the opposite limiting position of the operating member whereby to tense said yieldable means in a direction to urge said member toward said opposite limiting position.

5. The subject matter of claim 4 wherein said means for moving said carriage comprises reversible electrical drive means, and means operated by said member upon movement of the latter to each of said limiting positions for rendering said electrical drive means operable to move said carriage toward the opposite limiting position, and means for deactivating said electrical drive means upon predetermined movement of said carriage toward said opposite limiting position.

6. The subject matter of claim 4 wherein said member is mounted on said carriage for movement in said first-mentioned directions, and said yieldable means comprises a pair of springs acting between opposite sides of said member and said carriage.

7. The subject matter of claim 4 wherein said member comprises a rack adapted to mesh with a driven pinion.

No references cited.